(12) United States Patent
Hester

(10) Patent No.: US 6,789,329 B1
(45) Date of Patent: Sep. 14, 2004

(54) COMBINATION RETRACTABLE TAPE MEASURE/CHALK LINE DEVICE

(76) Inventor: Joey L. Hester, 724 Hestertown Rd., Lincolnton, NC (US) 28092

( * ) Notice: Subject to any disclaimer, the term of this patent is extended or adjusted under 35 U.S.C. 154(b) by 0 days.

(21) Appl. No.: 10/308,269

(22) Filed: Dec. 4, 2002

(51) Int. Cl.$^7$ ................................................ G01B 3/10
(52) U.S. Cl. .......................................... 33/760; 33/414
(58) Field of Search .......................... 33/413, 414, 755, 33/756, 759, 760, 761, 764, 767, 769

(56) References Cited

U.S. PATENT DOCUMENTS

| | | | | |
|---|---|---|---|---|
| 88,212 A | * | 3/1869 | Richardson | 33/414 |
| 426,434 A | * | 4/1890 | Campbell | 33/414 |
| 3,046,663 A | * | 7/1962 | Romero | 33/354 |
| 3,191,308 A | * | 6/1965 | Lindenau | 33/414 |
| 3,364,581 A | * | 1/1968 | Andrews | 33/427 |
| 3,662,471 A | * | 5/1972 | Lynde | 33/770 |
| 4,192,078 A | * | 3/1980 | Lore et al. | 33/414 |
| 4,438,538 A | | 3/1984 | Larsen | |
| 4,667,412 A | | 5/1987 | Carlson | |
| 4,679,325 A | * | 7/1987 | Sweatman | 33/760 |
| 4,697,349 A | | 10/1987 | Lee | |
| D312,795 S | | 12/1990 | Fugett | |
| 5,042,159 A | * | 8/1991 | Millen | 33/414 |
| 5,815,939 A | | 10/1998 | Ruffer | |
| 6,108,926 A | | 8/2000 | Fraser et al. | |

* cited by examiner

*Primary Examiner*—Diego Gutierrez
*Assistant Examiner*—Travis Reis

(57) ABSTRACT

A combination retractable tape measure/chalk line device for incorporating both a taper measure and a chalk line in one unit. The combination retractable tape measure a chalk line device includes a housing having front and side walls, and also having an intermediate wall disposed in the housing and separating the housing into first and second compartments; and also includes a chalk line dispensing assembly including a first spool being rotatably disposed in the first compartment, and also including a flexible line being carried about the first spool and being retractably extended from the housing, and further including a chalk substance being disposed in the first compartment and being deposited about and upon the flexible line; and further includes a tape measure assembly including a second spool being rotatably disposed in the second compartment, and also including a measuring tape being carried about the second spool and being retractably extended from the housing and having a plurality of markings and numbers displayed thereupon for determining distances and lengths; and also includes a support member being attached to the housing.

7 Claims, 2 Drawing Sheets

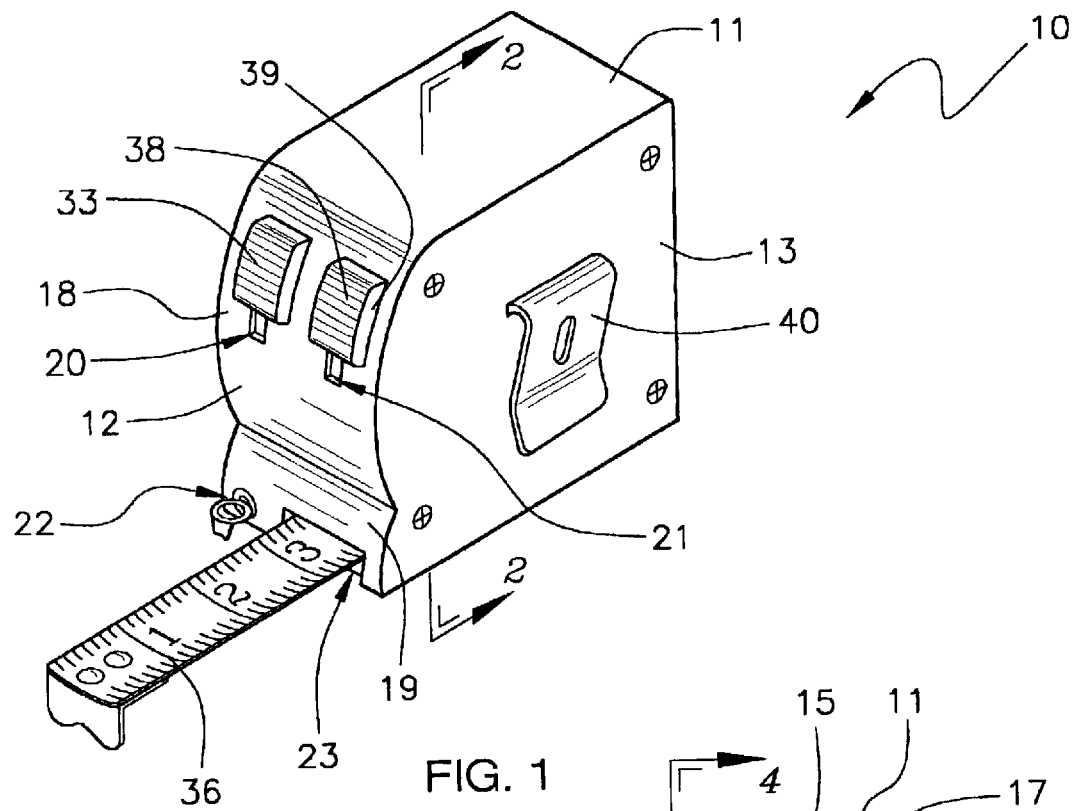
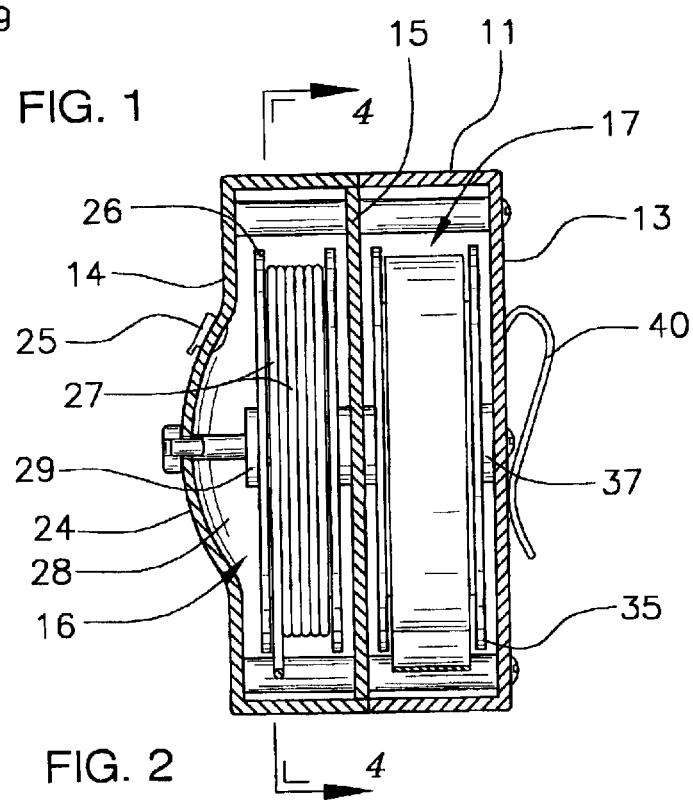

COMBINATION RETRACTABLE TAPE MEASURE/CHALK LINE DEVICE

BACKGROUND OF THE INVENTION

1. Field of the Invention

The present invention relates to tape measure/chalk line dispensers and more particularly pertains to a new combination retractable tape measure/chalk line device for incorporating both a taper measure and a chalk line in one unit.

2. Description of the Prior Art

The use of tape measure/chalk line dispensers is known in the prior art. More specifically, tape measure/chalk line dispensers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,108,926; U.S. Pat. No. 4,438,538; U.S. Pat. No. Des. 312,795; U.S. Pat. No. 4,697,349; U.S. Pat. No. 4,667,412; and U.S. Pat. No. 5,815,939.

While these devices fulfill their respective, particular objectives and requirements, the aforementioned patents do not disclose a new combination retractable tape measure/chalk line device. The prior art includes inventions having housings and measuring tapes being carried about spools and being extendably retracted in the housings.

SUMMARY OF THE INVENTION

The general purpose of the present invention, which will be described subsequently in greater detail, is to provide a new combination retractable tape measure/chalk line device which has many of the advantages of the tape measure/chalk line dispensers mentioned heretofore and many novel features that result in a new combination retractable tape measure/chalk line device which is not anticipated, rendered obvious, suggested, or even implied by any of the prior art tape measure/chalk line dispensers, either alone or in any combination thereof. The present invention includes a housing having front and side walls, and also having an intermediate wall disposed in the housing and separating the housing into first and second compartments; and also includes a chalk line dispensing assembly including a first spool being rotatably disposed in the first compartment, and also including a flexible line being carried about the first spool and being retractably extended from the housing, and further including a chalk substance being disposed in the first compartment and being deposited about and upon the flexible line; and further includes a tape measure assembly including a second spool being rotatably disposed in the second compartment, and also including a measuring tape being carried about the second spool and being retractably extended from the housing and having a plurality of markings and numbers displayed thereupon for determining distances and lengths; and also includes a support member being attached to the housing. None of the prior art includes a chalk substance being refillably disposed in the housing.

There has thus been outlined, rather broadly, the more important features of the combination retractable tape measure/chalk line device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new combination retractable tape measure/chalk line device which has many of the advantages of the tape measure/chalk line dispensers mentioned heretofore and many novel features that result in a new combination retractable tape measure/chalk line device which is not anticipated, rendered obvious, suggested, or even implied by any of the prior art tape measure/chalk line dispensers, either alone or in any combination thereof.

Still another object of the present invention is to provide a new combination retractable tape measure/chalk line device for incorporating both a taper measure and a chalk line in one unit.

Still yet another object of the present invention is to provide a new combination retractable tape measure/chalk line device that is easy and convenient to use.

Even still another object of the present invention is to provide a new combination retractable tape measure/chalk line device that eliminates the user from having to carrying two separate units and also increases the performance of the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new combination retractable tape measure/chalk line device according to the present invention.

FIG. 2 is a lateral cross-sectional view of the present invention.

DESCRIPTION OF THE PREFERRED EMBODIMENT

Figure 3:
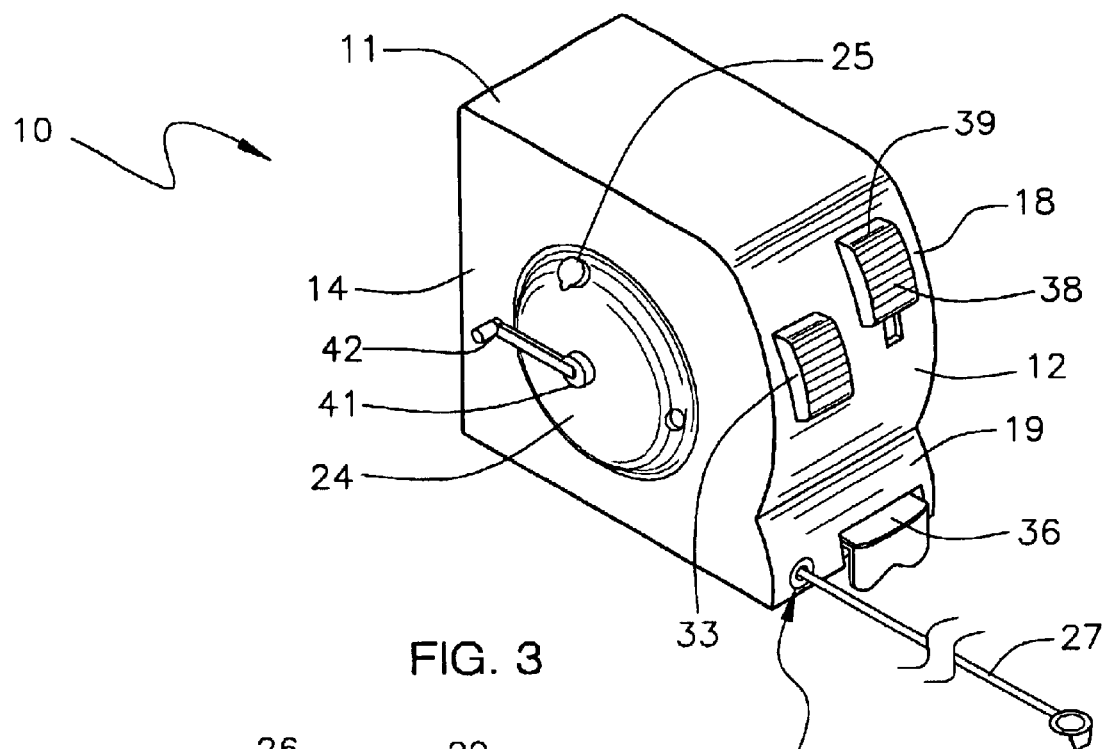
FIG. 3 is another perspective view of the present invention.
Figure 4:
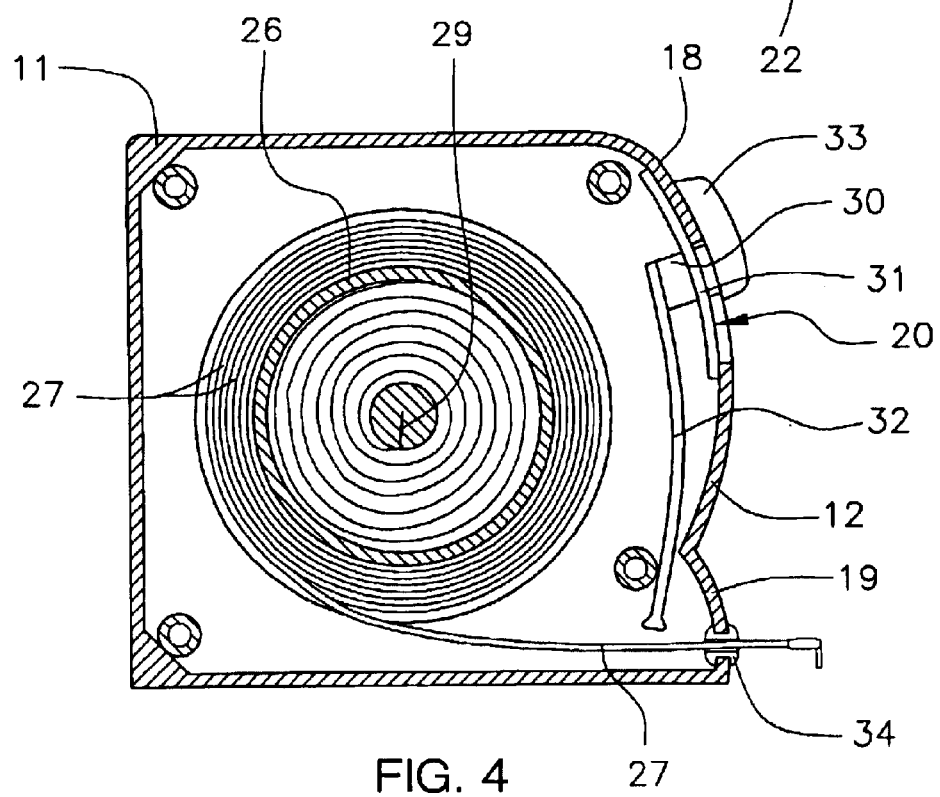
FIG. 4 is a longitudinal cross-sectional view of the present invention.

With reference now to the drawings, and in particular to FIGS. 1 through 4 thereof, a new combination retractable tape measure/chalk line device embodying the principles and concepts of the present invention and generally designated by the reference numeral 10 will be described.

As best illustrated in FIGS. 1 through 4, the combination retractable tape measure/chalk line device 10 generally comprises a housing 11 having front and side walls 12–14, and also having an intermediate wall 15 being conventionally disposed in the housing 11 and separating the housing into first and second compartments 16, 17. The front wall 12 of the housing 11 has an upper portion 18 and a lower portion 19. The housing 11 further includes a first longitudinal slot 20 being disposed through the upper portion 18 of the front wall 12, and also includes a second longitudinal slot 21 also being disposed through the upper portion 18 of the front wall 12, and further includes a hole 22 being disposed through the lower portion 19 of the front wall 12 and into the first compartment 16, and also includes a lateral-extending slot 23 being disposed through the lower portion 19 of the front wall 12 and into the second compartment 17. One of the side walls 14 of the housing has an outwardly bowed intermediate portion 24, and has a closable chalk-fill port 25 being disposed through the intermediate portion 24 and into the first compartment 16.

A chalk line dispensing assembly includes a first spool 26 being rotatably and conventionally disposed in the first compartment 16, and also includes a flexible line 27 being carried about the first spool 26 and being retractably extended from the housing 11, and further includes a chalk substance 28 being disposed in the first compartment 16 and being deposited about and upon the flexible line 27, and also includes a shaft 41 being conventionally attached to the first spool 26 and being extended through the outwardly bowed intermediate portion 24 of the housing 11, and further includes a crank 42 being conventionally attached to the shaft 41 for manually taking up the flexible line 27 about the first spool 26. The chalk line dispensing assembly further includes a spring 29 being conventionally disposed about the first spool 26 for biasedly retracting the flexible line 27 in the first compartment 16 and about the first spool 26, and also includes a first stop member 30 being engagable to the flexible line 27 to prevent the flexible line 27 from being taken up by the first spool 26. The first stop member 30 includes a seal member 31 being movably and conventionally disposed over the first longitudinal slot 20 in the first compartment 16 to prevent the chalk substance 28 from leaking through the first longitudinal slot 20, and also includes an arm 32 being conventionally attached to the seal member 31 and being engagable to the flexible line 27, and further includes a button-like actuator 33 being conventionally attached to the seal member 31 and being movably disposed upon the front wall 12 of the housing 11. The chalk line dispensing assembly further includes an O-ring 34 being securely and conventionally disposed about the hole 22 of the housing 11 to prevent the chalk substance 28 from leaking through the hole 22 from the first compartment 16.

A tape measure assembly includes a second spool 35 being rotatably and conventionally disposed in the second compartment 17, and also includes a measuring tape 36 being carried about the second spool 35 and being retractably extended from the housing 11 and having a plurality of markings and numbers displayed thereupon for determining distances and lengths. The tape measure assembly further includes a spring member 37 being conventionally disposed about the second spool 35 for biasedly retracting the measuring tape 36 in the second compartment 17 and about the second spool 35, and also includes a second stop member 38 being conventionally engagable to the measuring tape 36 to prevent the measuring tape 36 from being taken up by the second spool 35. The second stop member 38 includes a second button-like actuator 39 being movably disposed upon the front wall 12 of the housing 11.

A support member is conventionally attached to the housing 11. The support member is a clip member 40 having a sinusoidal-shaped plate member having an end being securely and conventionally attached to an exterior of one of the side walls 13 of the housing 11 and having a portion which is biasedly disposed against the side wall 11.

In use, the user extends the measuring tape 36 to take measurements, and extends the flexible line 22 with the chalk substance 28 being disposed about the flexible line 22 to make the selected markings upon the particular surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the combination retractable tape measure/chalk line device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination retractable tape measure/chalk line device comprising:

a housing having front and side walls, and also having an intermediate wall disposed in said housing and separating said housing into first and second compartments, said front wall of said housing having an upper portion and a lower portion, said housing further including a first longitudinal slot being disposed through said upper portion of said front wall, and also includes a second longitudinal slot also being disposed through said upper portion of said front wall, and further including a hole being disposed through said lower portion of said front wall and into said first compartment, and also including a lateral-extending slot being disposed through said lower portion of said front wall and into said second compartment, one of said side walls of said housing having an outwardly bowed intermediate portion, and having a closable chalk-fill port being disposed through said intermediate portion and into said first compartment, a chalk line dispensing assembly including a first spool being rotatably disposed in said first compartment and also including a flexible line being carried about said first spool and being retractably extended from said housing, and further including a chalk substance being disposed in said first compartment and being deposited about and upon said flexible line, and also including a shaft being attached to said first spool and being extended through said side wall of said housing, and further including a crank being attached to said shaft for manually taking up said flexible line about said first spool;

a tape measure assembly including a second spool being rotatably disposed in said second compartment, and also including a measuring tape being carried about said second spool and being retractably extended from said housing and having a plurality of markings and numbers displayed thereupon for determining distances and lengths; and a support member being attached to said housing.

2. A combination retractable tape measure/chalk line device as described in claim 1, said chalk line dispensing assembly further includes a spring being disposed about said first spool for biasedly retracting said flexible line in said first compartment and about said first spool, and also includes a first stop member being engageable to said flexible line to prevent said flexible line from being taken up by said first spool.

3. A combination retractable tape measure/chalk line device as described in claim 1, wherein said first stop member includes a seal member being movably disposed over said first longitudinal slot in said first compartment to prevent said chalk substance from leaking through said first longitudinal slot, and also includes an arm being attached to said seal member and being engageable to said flexible line, and further includes a button-like actuator being attached to said seal member and being movably disposed upon said front wall of said housing.

4. A combination retractable tape measure/chalk line device as described in claim 3, wherein said chalk line dispensing assembly further includes an O-ring being securely disposed about said hole of said housing to prevent said chalk substance from leaking through said hole from said first compartment.

5. A combination retractable tape measure/chalk line device as described in claim 1, wherein said tape measure assembly further includes a spring member being disposed about said second spool for biasedly retracting said measuring tape in said second compartment and about said second spool, and also includes a second stop member being engageable to said measuring tape to prevent said measuring tape from being taken up by said second spool.

6. A combination retractable tape measure/chalk line device as described in claim 5, wherein said second stop members includes a second button-like actuator being movably disposed upon said front wall of said housing.

7. A combination retractable tape measure/chalk line device as described in claim 1, wherein said support member is a clip member having a sinusoidal-shaped plate member having an end securely attached to an exterior of one of said side walls of said housing and having a portion which is biasedly disposed against said side wall.

* * * * *